United States Patent
Fagan et al.

(10) Patent No.: US 6,595,445 B2
(45) Date of Patent: Jul. 22, 2003

(54) COFFEE GRINDER WITH CHAFF DISPERSION REDUCING APPARATUS AND METHOD

(75) Inventors: Michael J. Fagan, Libertyville, IL (US); Marek K. Kwiatkowski, Round Lake, IL (US); Wit Gavin Niesiolowski, Des Plains, IL (US)

(73) Assignee: Food Equipment Technologies Company, Inc., Lincolnshire, IL (US)

( * ) Notice: Subject to any disclaimer, the term of this patent is extended or adjusted under 35 U.S.C. 154(b) by 0 days.

(21) Appl. No.: 10/030,201

(22) PCT Filed: Apr. 27, 2001

(86) PCT No.: PCT/US01/13517
§ 371 (c)(1),
(2), (4) Date: Dec. 26, 2001

(87) PCT Pub. No.: WO01/81000
PCT Pub. Date: Nov. 1, 2001

(65) Prior Publication Data
US 2003/0102393 A1 Jun. 5, 2003

Related U.S. Application Data

(60) Provisional application No. 60/200,039, filed on Apr. 27, 2000.

(51) Int. Cl.$^7$ .......................... B02C 23/08; B02C 19/00
(52) U.S. Cl. .................. 241/79.1; 241/186.3; 241/245; 241/7; 241/26; 99/286; 99/290
(58) Field of Search .................. 99/286, 290; 241/79.1, 241/100, 186.3, 245, 246, 247, 248, 6, 7, 26

(56) References Cited

U.S. PATENT DOCUMENTS 5,950,941 A * 9/1999 McNeill et al. ............ 241/79.1

* cited by examiner

Primary Examiner—Reginald L. Alexander
(74) Attorney, Agent, or Firm—James W. Potthast

(57) ABSTRACT

A coffee grinder assembly with a housing containing a pair of hoppers for containing coffee beans with a pair of hopper outlet chutes, or grinding chamber inlet chutes for feeding beans into a grinding chamber where the beans are ground by powered grinding discs or blades and then passed to a removable brew basket via an outlet chute with an outlet end that is in communication with a negative ion generator that ionizes the air in the outlet chute through which the ground coffee and chaff pass on their way to the brew basket to electrically neutralize the chaff to reduce chaff dispersion due to electrostatic repulsion of positively charged chaff.

27 Claims, 3 Drawing Sheets

COFFEE GRINDER WITH CHAFF DISPERSION REDUCING APPARATUS AND METHOD

This application claims benefit to United States Provisional Application No. 60/200,039 filed Apr. 27, 2000 under 35 USC 119(e).

BACKGROUND OF THE INVENTION

1. Field of the Invention

This invention relates generally to coffee grinders and, more specifically, to electrically powered grinders that employ rapidly rotating grinding discs.

2. Discussion of the Prior Art

Electrical coffee grinders of the type that have grinding wheels that operate a high speed are well known in art. Reference may be made to co-pending PCT application serial number PCT/US00/11379 filed Apr. 28, 2000 and entitled "Coffee Grinder with Removable Ingredient Hopper and Method", which is hereby incorporated by reference for some of the details of such grinders. Briefly, they include a hopper containing the coffee beans and having an outlet with an electrically controlled gate. When the outlet gate is opened, the coffee beans pass through the outlet and into a grinding chamber within which are contained a set of intermeshing grinding discs or wheels that are driven in rotation by an electrical motor. The ground coffee then passes out of the grinding chamber and through an outlet chute and into a suitable container or into a brew basket with a filter paper to hold the ground coffee. The discs are preferably made of ceramic but others are made of stainless steel.

A problem with such grinders is often small particles of the ground coffee known as chaff, chaff fines, or fines, fly out of the chute and misses the filter within the brew basket or other container. It escapes from the top of the brew basket even though pressed against the grinder housing. The chaff flies through the air and eventually lands on the outside surfaces of the grinder housing, the brew basket, the counter tops and the floors and wall in the vicinity of the grinder. Although most of the ground coffee makes it into the filter paper within the brew basket, over time the grounds that do not make it into the filter accumulate and must be cleaned up. In addition to making a mess, the loose coffee grounds are wasted.

It is believed by the present inventor that this problem is caused or exasperated by the grinding action of the grinding discs with the ground coffee causing a positive static charge being built up on the individual fine particles of ground coffee, or chaff. As a result of the static charge being all of the same polarity, the charged chaff particles are repelled from one another, from the coffee grounds that are in the brew basket and generally from any other positively charged surfaces. It is believed that this is why there is not a smooth flow of the ground coffee including the chaff in a contained stream from the outlet chute without dispersion of the chaff particle outside of the stream.

SUMMARY OF THE INVENTION

In accordance with the present invention, the aforementioned problem of loose chaff is overcome by artificially creating a source of negative ions through which the positively charged chaff must pass to neutralize the chaff before passing from the outlet chute.

This objective is achieved in part by providing a coffee grinder having housing containing a hopper for storage of coffee beans to be ground, a grinding chamber with a set of intermeshing grinding discs, a hopper outlet gate for selectively passing coffee beans from the hopper to the grinding chamber to be ground by the set of intermeshing grinding discs, and an outlet chute for passing the ground coffee out of the grinding chamber, with a chaff dispersion reducing apparatus having means for artificially creating negatively charged ions within the housing and means for passing the negatively charged ions into contact with chaff produced during the grinding of the coffee beans to neutralize the chaff before leaving the housing. Preferably, the ion creating means creates ions in the outlet chute while the emitter is mounted in communication with the interior of the outlet chute adjacent an open, outlet end of the outlet chute.

Preferably, the generating means is a negative ion generator that functions to ionize ambient atoms of air to give them a negative charge. The negative ion generator has an emitter, and means for producing an electrical charge on the emitter having a voltage sufficiently high to emit large quantities of electrons to negatively ionize the air. The producing means includes a D.C. power supply for producing a low current, high voltage D.C. voltage on the emitter connected with a source of A.C. power. Preferably, the voltage is on the order of 8400-volts. A ion generator power supply located within the housing and outside of the interior produces the high voltage and a power lead extending to the emitter is mounted in communication with the interior of the outlet chute.

The objective of the invention is also obtained in part by providing in a coffee grinder having housing containing a hopper for storage of coffee beans to be ground, a grinding chamber with a set of intermeshing grinding discs, a hopper outlet gate for selectively passing coffee beans from the hopper to the grinding chamber to be ground by the set of intermeshing grinding discs, and an outlet chute for passing the ground coffee out of the grinding chamber with a method of reducing chaff dispersion and to enhance the controlled flow of chaff out of the outlet chute by performing the steps of artificially creating negatively charged ions within the housing, and passing the chaff into contact with the negatively charged ions before the chaff passes out of the outlet chute to electrically neutralize the chaff.

The objective is also obtained by providing a coffee grinder having housing containing a hopper for storage of coffee beans to be ground, a grinding chamber with a set of intermeshing grinding discs, a hopper outlet, gate for selectively passing coffee beans from the hopper to the grinding chamber to be ground by the set of intermeshing grinding discs with a chaff dispersion reducing apparatus having means for artificially creating negatively charged ions, and means for passing the ground coffee and chaff through the negatively charged ions to neutralize the chaff.

Preferably, the coffee grinder includes an outlet chute for passing ground coffee from the grinding chamber to a brew basket with a outlet pipe for passing the ground coffee from the grinding chamber to the brew basket, and an insulating collar surrounding the metal outlet pipe and in which said creating means creates negatively charged ions within the collar and beneath an outlet end of the outlet pipe. The insulated collar has a bottom with a downwardly facing annular groove surrounding the outlet pipe and in which the creating means creates negatively charged ions within the annular groove. The emitter extends from an emitter body contained within a mounting hole in the collar into the groove to create ions within the groove and beneath a bottom outlet end of the outlet pipe. The grinder has means for mounting an open top of a brew basket against a bottom of the collar and the ions are created beneath the bottom of the outlet pipe and within the brew basket, the brew basket retarding dispersion of the ions to areas through which the chaff does not pass.

BRIEF DESCRIPTION OF THE DRAWINGS

The forgoing objects and advantageous features of the invention will be explained in greater detail and others will be made apparent from the detailed description of the preferred embodiment of the present invention that is given with reference to the several figures of the drawing, in which.

DESCRIPTION OF THE PREFERRED EMBODIMENT

Figure 1:
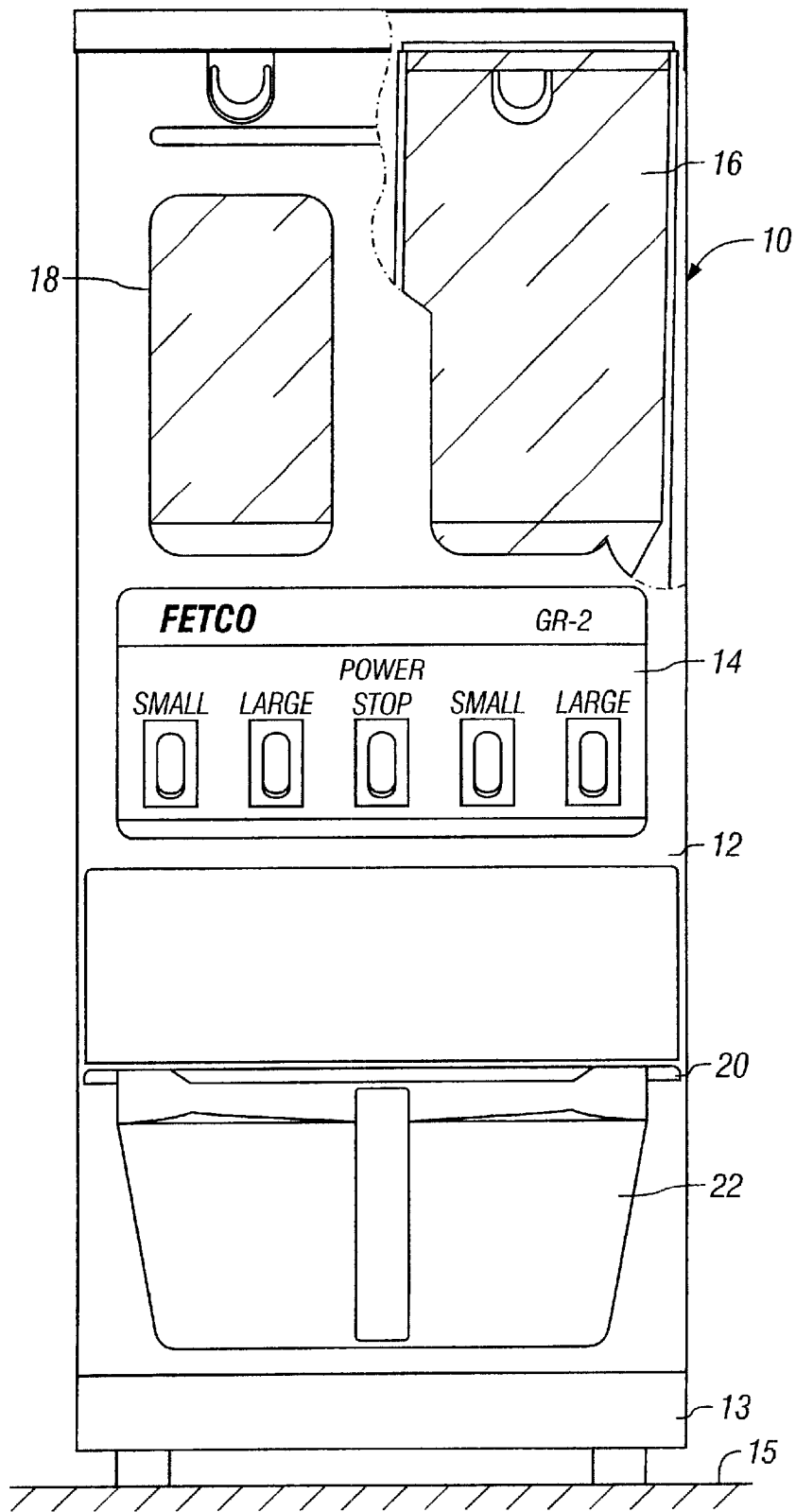
FIG. 1 is front elevation view of a preferred embodiment of grinder of the invention.

Referring now to FIG. 1, the preferred embodiment of the chaff reducing grinder assembly 10 for grinding a food ingredient, and more specifically coffee beans, is seen to have a housing 12 with a control panel 14, a pair of ingredient hoppers 16 and 18 in which are stored coffee beans or the like, a removable brew basket mount 20 for removably mounting a brew basket 22 beneath an outlet chute 36 to receive the ground coffee. The housing 12 has a base 13 with legs for supporting the grinder 10 above a counter top 15.

Figure 2:
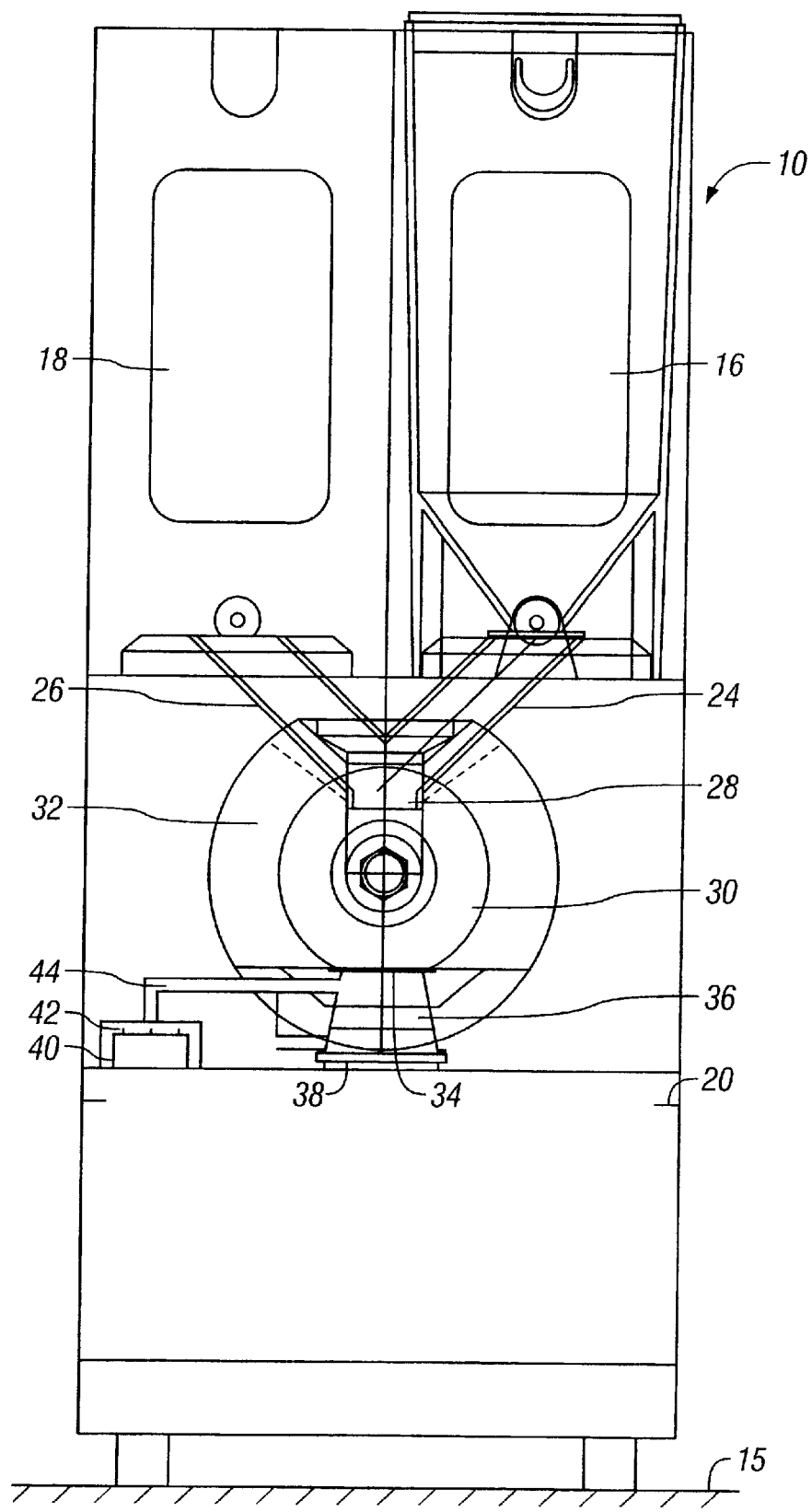
FIG. 2 is a front elevation schematic illustration of one form of the grinder of FIG. 1 with portions cut away for a view of the interior components including the negative ion generator.
Figure 3:
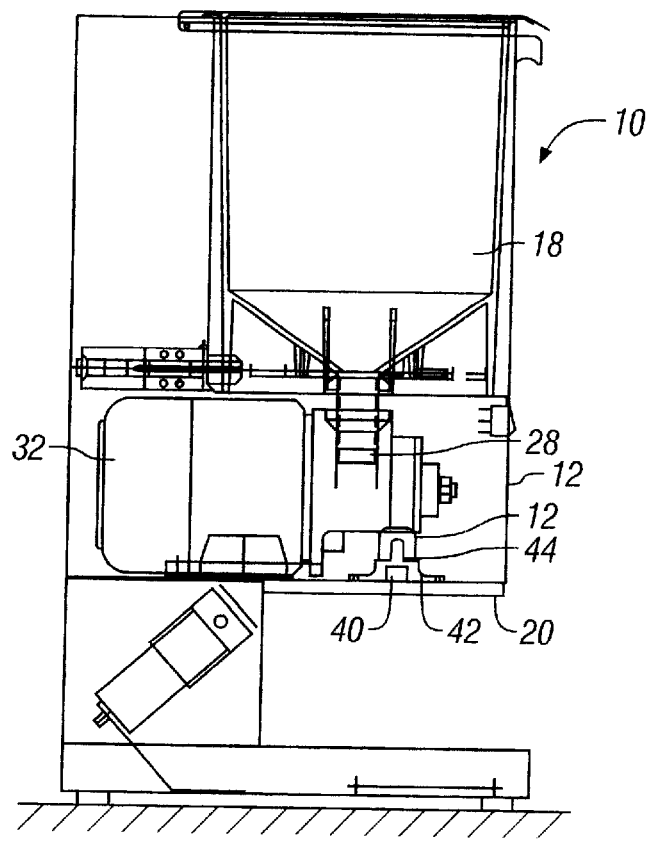
FIG. 3 is side view of the grinder of FIGS. 2 with portions broken to provide a side view the interior components.
Figure 4:
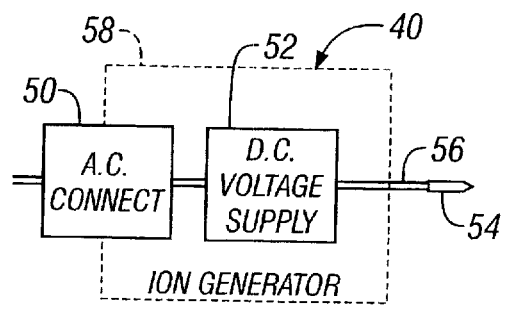
FIG. 4 is a functional block diagram of the negative ion generator of FIGS. 2 and 3, and of FIG. 5 below.

Referring now to FIGS. 2 and 3, grinding chamber inlet chutes, or hopper outlet chutes, 24 and 26 extend downwardly from the bottoms of the hoppers 16 and 18, respectively, to a juncture 28 that then feeds the coffee beans into a grinding chamber 30 that is used for both hoppers 14. Powered grinding blades (not shown) within the chamber are driven by an electrical motor 32. At the bottom of the grinding chamber 30 is an outlet chute 36 that directs the ground coffee from an inlet 36 at the bottom outlet of the grinding chamber 30 to an open chute outlet 38.

Referring to FIG. 2 and 3, in accordance with the invention, a negative ion generator 40 is located within the housing 12 and generates negative ions into the air within an ion chamber 42 that is in air communication with the interior of the outlet chute through an ionized air tube 44. The movement of the ground coffee passing through the chute 36 creates a partial vacuum that draws the ionized air from the ion chamber 42 and through the ion tube and into the chute 36 to neutralize the positive static charges on the coffee being passed through the chute 36. The ion generator is a Model G1785 negative ion generator distributed by ELECTRONIC GOLDMINE. Alternatively and preferably, the ion generator is a Model SW750, 120 VAC, 60-Hz negative ion generator with a maximum output voltage of 8.4-kvolt made by Seawise Industrial Ltd. of Kowloon, Hong Kong. Ion generators with higher voltages such as 12.4-kvolt Model SW1200 could also be used but it is not believed that higher voltages are needed. Lower voltages may be possible but this needs to be determined individually for the particular dimensions of each particular grinder being made with an anti-dispersion system. The ion generator 40 is powered by standard 115VAC electrical power that is switched to the ion generator 40 whenever the grinder motor 32 receives power. Alternatively, the power to the ion generator remains on at all times.

Referring to FIG. 4, the ion generator 40 is seen to include an A.C. power connector 50 for connection to a 115-volt power source and a D.C. power supply 52 that produces a voltage of approximately negative 8.6-kilovolts at a very low current. This high voltage is applied to the end of at least one emitter 54 connected to the power supply via an insulated lead 56. The power supply 52 and A.C. power connector 50 and insulated lead 56. The A.C. power supply 50 is contained within a housing 58 and the A.C. power connector leads 50 are connected within and extend outside of the housing 56.

In the embodiment shown in FIGS. 2 and 3, the ion generator 40 is substantially sealed within the ion chamber 42 to protect the circuitry, etc. against contact with the coffee itself and the oils from the coffee. Suitable filter material may be placed into the ionized air tube that will allow the passage of ionized air into the outlet chute or the grinding chamber but which will not allow coffee particles or coffee oil to pass the other way and contaminate the ion generator 40. If desired a fan may be added to draw the ionized air from the ion chamber 42 into the outlet chute 36 and beneath the outlet chute 36 within the brew basket 22.

While the embodiment shown in FIGS. 2 and 3 in which one or more emitters 54 are contained within the ion chamber 40 and the ions are transported from the ion chamber 42 to the outlet chute 36 via ionized air tube 44 is capable of passing ions into the interior outlet chute 36 and help reduce chaff dispersion, an alternative and preferred, although more perhaps more complicated embodiment is shown in FIG. 4.

Referring to FIG. 4, the outlet chute 36 includes a stainless steel cylindrical outlet pipe 57, preferably 303-stainless or 304-stainless, having a half-inch diameter and a length of 1½ inches though which the grounds and an insulated collar 58. The outlet pipe 36 is surrounded by the insulating collar 58 which is preferably made from PTFE TEFLON®. The insulating collar 58 has a generally truncated conical shape with an interior that expands outwardly from the outlet end of the outlet pipe 57 to adjacent the edges 60 of the open top of the brew basket 22. The bottom 62 of the collar 58 extends beneath the bottom of the outlet pipe 57.

Formed in the bottom 68 of the collar 58 is an arcuate, downwardly facing, annular groove or ion passageway 62 that surrounds the bottom of the outlet pipe 57 and communicates with the bottom of the outlet chute 36 which coincides with and is defined by the bottom 68 of the collar 58. The annular ion passageway 62 has an interior edge 64 that is level with and adjacent to the bottom of the outlet pipe 57. An outer edge 66 is located level with the bottom 68 of the collar 58 and located inwardly from the outer edge 60 of the brew basket 22.

Extending into a top 70 of the annular groove 62 from an annular shoulder 72 is at least one emitter mounting hole within which is snugly received an emitter 54. The emitter 54' has a pointed end 74, having a point like a sharpened pencil, and an elongate body that substantial fills the mounting hole to seal it closed. An annular access grove 76 in the shoulder 72 surrounds the mounting hole to enable grasping an end of the emitter 54' extending upwardly out of the mounting hole to facilitate mounting and removal of the emitter 54'. The insulated lead 56 is fitted into a hole in the end the emitter 54', that is preferably made of a solid cylinder of stainless steel, and soldered in place.

It has been found that the ions circulate within the annular ion passageway 62, beneath the bottom of the outlet pipe 57 within the insulating collar 58 and also beneath the outlet pipe 57 but within the outlet chute beneath the outlet pipe 57 and also within the brew basket 22 between the bottom 68 of the collar 58 and the top 78 of ingredient contained within the brew basket 22. The close or snug fit of the top edge of the brew basket 22 against the bottom 68 of the collar 58 traps the ions in the space beneath the outlet pipe 57 through which the ground coffee and the chaff must pass. The annular grove 62 filled with ions surrounds the chaff and neutralizes any that moves laterally from the bottom of the outlet chute 36 to the outer edges 60 of the top of the brew basket 22 and thereby prevent their escape.

Figure 5:
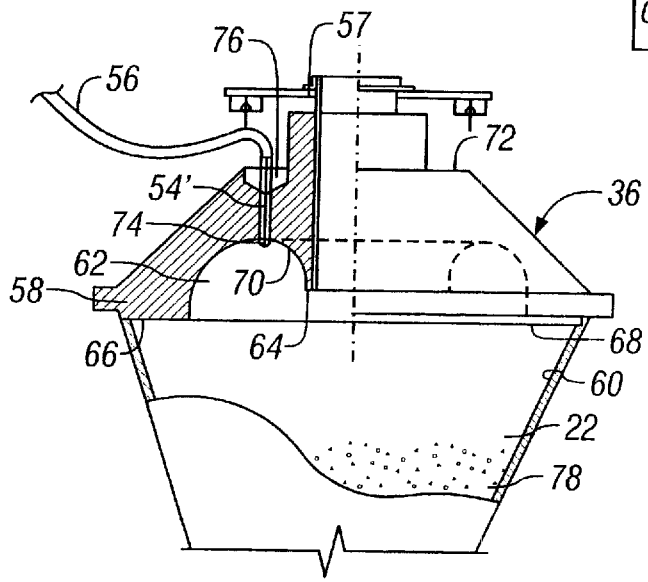
FIG. 5 is a side elevation, with parts in cross section of a novel outlet chute illustrating an alternative and preferred form of the invention.

While additional emitters 54' may be added at other locations around the circumference of the annular ion passageway 62, it has been found that a single emitter with the, voltage indicated above is sufficient. Also, the embodiment of FIG. 5 can be combined with that of FIGS. 2 and 3 to provide ions both in the outlet pipe 57, as in FIGS. 2 and 3, in which the entire outlet chute functions as the outlet pipe, as well as providing them beneath the outlet pipe but within the outlet chute 57 as well as beneath the outlet pipe 57 and within the space between the bottom 68 of the chute 36 and collar 58 and the top 78 of the ground ingredient within the brew basket.

While particular embodiments have been disclosed in detail, it should be appreciated that many variations may be made with respect to these details without departing from the scope of the invention as defined in the appended claims.

What is claimed is:

1. In a coffee grinder having housing containing a hopper for storage of coffee beans to be ground, a grinding chamber with a set of intermeshing grinding discs, a hopper outlet gate for selectively passing coffee beans from the hopper to the grinding chamber to be ground by the set of intermeshing grinding discs, and an outlet chute for passing the ground coffee out of the grinding chamber, the improvement being a chaff dispersion reducing apparatus, comprising:

means for artificially creating negatively charged ions within the housing; and means for passing the negatively charged ions into contact with chaff produced during the grinding of the coffee beans to neutralize the chaff.

2. The coffee grinder of claim 1 in which the generating means is a negative ion generator that functions to ionize ambient atoms of air to give them a negative charge.

3. The coffee grinder of claim 2 in which the negative ion generator has an emitter, and means for producing an electrical charge on the emitter having a voltage sufficiently high to emit large quantities of electrons to negatively ionize the air.

4. The coffee grinder of claim 3 in which the producing means include a D.C. power supply for producing a low current, high voltage D.C. voltage on the emitter connected with a source of A.C. power.

5. The coffee grinder of claim 3 in which the voltage is on the order of 8400-volts.

6. The coffee grinder of claim 1 in which the ion creating means creates ions in the outlet chute.

7. The coffee grounder of claim 6 in which
the outlet chute has an outlet pipe and an electrical insulating collar surrounding the outlet pipe, and
the ion creating means creates ions in the outlet chute beneath the outlet pipe and above the bottom of the chute.

8. The coffee grinder of claim 7 in which the insulating collar has a an annular downwardly facing grove surrounding the outlet pipe the ion creating means creates ions in the annular groove within the outlet chute.

9. The coffee grinder of claim 7 in which
the ion creating means is an electrical negative ion generator with a charged emitter, and
the means for passing includes means for mounting the emitter in communication with the interior of the outlet chute.

10. The coffee grinder of claim 7 in which the mounting means mounts the emitter in communication with the interior of the outlet chute adjacent an open, outlet end of the outlet chute.

11. The coffee grinder of claim 7 in which the electrical negative ion generator includes
a power supply located within the housing and outside of the interior, and
a power lead extending to the emitter mounted in communication with the interior of the outlet chute.

12. In a coffee grinder having housing containing a hopper for storage of coffee beans to be ground, a grinding chamber with a set of intermeshing grinding discs, a hopper outlet gate for selectively passing coffee beans from the hopper to the grinding chamber to be ground by the set of intermeshing grinding discs, and an outlet chute for passing the ground coffee out of the grinding chamber, the improvement being a method of enhancing the controlled flow of chaff out of the outlet chute, comprising the steps of:
artificially creating negatively charged ions within the housing; and passing the chaff into contact with the negatively charged ions before the chaff passes out of the outlet chute to electrically neutralize the chaff.

13. The method of claim 12 in which
the step of artificially creating negatively charged ions is performed with an electrical negative ion generator that functions to ionize ambient atoms of air through which the chaff passes to give them a negative charge, and including the step of
passing the electrical negative charge from the ions to positively charged chaff to neutralize the chaff.

14. The method of coffee grinder of claim 13 in which the negative ion generator has an emitter, and including the step of
producing an electrical charge on the emitter having a voltage sufficiently high to emit large quantities of electrons to negatively ionize the air.

15. The method of claim 14 in which the step of producing an electrical charge includes the step of providing A.C. power to a D.C. power supply to produce a voltage applied to the emitter.

16. The method of claim 15 in which the voltage is on the order of 8400-volts.

17. The method of claim 12 in which the ions are created in the outlet chute during the step of creating ions.

18. The method of claim 17 in which
the step of creating ions is performed by an electrical negative ion generator with a charged emitter, and
the step of passing includes the step of mounting the emitter in communication with the interior of the outlet chute.

19. The method of claim 12 in which the step of mounting includes the step of mounting the emitter in communication with the interior of the outlet chute adjacent an open, outlet end of the outlet chute.

20. The method of claim 12 in which the electrical negative ion generator includes
   a power supply located within the housing and outside of the interior, and
   a power lead extending to the emitter mounted in communication with the interior of the outlet chute.

21. The method of claim 12 including the step of passing the chaff into contact with the negatively charged ions after the chaff passes out of the outlet chute and into a brew basket mounted to the outlet chute to electrically neutralize the chaff.

22. The method of claim 12 including the step of ionizing the air in an annular passageway surrounding and in communication with a bottom of the outlet chute and an open top of a brew basket releasably mounted to the outlet chute.

23. In a coffee grinder having housing containing a hopper for storage of coffee beans to be ground, a grinding chamber with a set of intermeshing grinding discs, a hopper outlet gate for selectively passing coffee beans from the hopper to the grinding chamber to be ground by the set of intermeshing grinding discs, the improvement being a chaff dispersion reducing apparatus, comprising:
   means for artificially creating negatively charged ions; and
   means for passing the ground coffee and chaff through the negatively charged ions to neutralize the chaff.

24. The coffee grinder of claim 23, including an outlet chute for passing ground coffee from the grinding chamber to a brew basket with a outlet pipe for passing the/ground coffee from the grinding chamber to the brew basket, and an insulating collar surrounding the metal outlet pipe and in which said creating means creates negatively charged ions within the collar and beneath an outlet end of the outlet pipe.

25. The coffee grinder of claim 24 in which the insulated collar has a bottom with a downwardly facing annular groove surrounding the outlet pipe and in which the creating means creates negatively charged ions within the annular groove.

26. The coffee grinder of claim 23 in which a point of an emitter extends from an emitter body contained within a mounting hole in the collar into the groove to create ions within the groove and beneath a bottom outlet end of the outlet pipe.

27. The coffee grinder of claim 23 including means for mounting an open top of a brew basket against a bottom of the collar and in which the ions are created beneath the bottom of the outlet pipe and within the brew basket, the brew basket retarding dispersion of the ions to areas through which the chaff does not pass.

* * * * *